United States Patent [19]

Thomas

[11] 3,968,810

[45] July 13, 1976

[54] CONVERTIBLE WALKER

[76] Inventor: Morton I. Thomas, 125 South St., Passaic, N.J. 07055

[22] Filed: Nov. 18, 1974

[21] Appl. No.: 524,476

[52] U.S. Cl. .................. 135/45 A; 135/50

[51] Int. Cl.² .................. F16M 13/08

[58] Field of Search .................. 135/45 A

[56] References Cited

UNITED STATES PATENTS

| | | | |
|---|---|---|---|
| 2,796,916 | 6/1957 | Womble | 135/45 A |
| 2,996,070 | 8/1961 | Ries | 135/45 A |
| 3,442,276 | 5/1969 | Edwards et al. | 135/45 A |
| 3,517,677 | 6/1970 | Smith | 135/45 A |
| 3,596,668 | 8/1971 | Tosto | 135/45 A |
| 3,716,067 | 2/1973 | Skoog | 135/45 A |

*Primary Examiner*—Werner H. Schroeder
*Assistant Examiner*—Conrad L. Berman

[57] ABSTRACT

A walker construction including extensible and removable legs telescopically received in leg engaging portions, the dimensions and structural features of the interrelated legs and leg receiving portions being such as to imbue the complete walker structure with a number of desirable properties and advantages.

4 Claims, 3 Drawing Figures

CONVERTIBLE WALKER

BACKGROUND OF THE INVENTION

Conventional walkers of the type having telescopic legs present several disadvantages including excessive transportation charges due to irreducible height thereof; while usable by adults do not lend themselves usable by children; a structure which tends to impair stability of the device, particularly when the legs thereof are moved to extend positions; requires carrying in inventory separate adult and children's walkers resulting in excessive costs.

Accordingly, an object of this invention is to provide an improved walker having leg receiving portions and leg members telescopically receivable in the leg receiving portions; the linear dimensions of the leg receiving portions and the leg members being correlated to allow a single walker to be used either by an adult or by a child.

Another object of this invention is to provide a walker of the character described wherein the correlated dimensions of the leg receiving portions and the leg members allow for stability of the device in either of its conditions of use by adults or children.

A further object of this invention is to provide a walker of the character described, wherein the leg receiving portions thereof are of a length less then that of conventional walkers; and the leg members receivable in said leg receiving portions are of a length substantially equal to the length of the leg receiving portions whereby with the leg members in their fully retracted positions, the overall height of the walker is minimized so as to allow for reduced transportation charges.

Still another object of this invention is to provide a walker of the character described, wherein the correlated linear dimensions of the leg receiving portions and the leg members are such as to permit the use of such walker by individuals of a large range of heights including a child of a height of 4′ 4″ when the leg members are fully retracted, and adults of a height of 6′ 4″ when the leg members are fully extended; together with adjustments at points along the leg receiving portions for use of the walker by individuals having heights intermediate 4′ 4″ and 6′ 4″; thereby permitting a single walker structure to be utilized by children as well as adults Yet another object of this invention is to provide an improved walker of the character described which can be easily manipulated to bring the leg members to their fully retracted positions irrespective of their original positions; to thereby allow the walker to be disposed relative to a toilet bowl so as to afford guide or support means by the user thereof, particularly when such user is elderly, disabled or the like.

Other objects of this invention will in part be obvious and in part hereinafter pointed out.

DESCRIPTION OF THE PREFERRED EMBODIMENT

Figure 1:
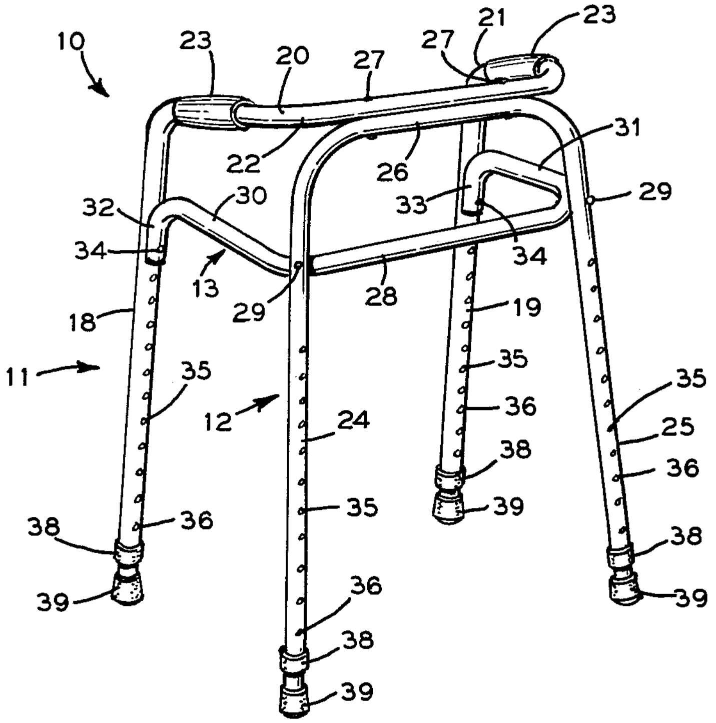
FIG. 1 is a perspective view of a convertible walker embodying the invention, where the leg members thereof are fully retracted relative to leg receiving portions to thereby permit the use of the walker by a child and to facilitate packaging to qualify for minimal transport charges.
Figure 2:
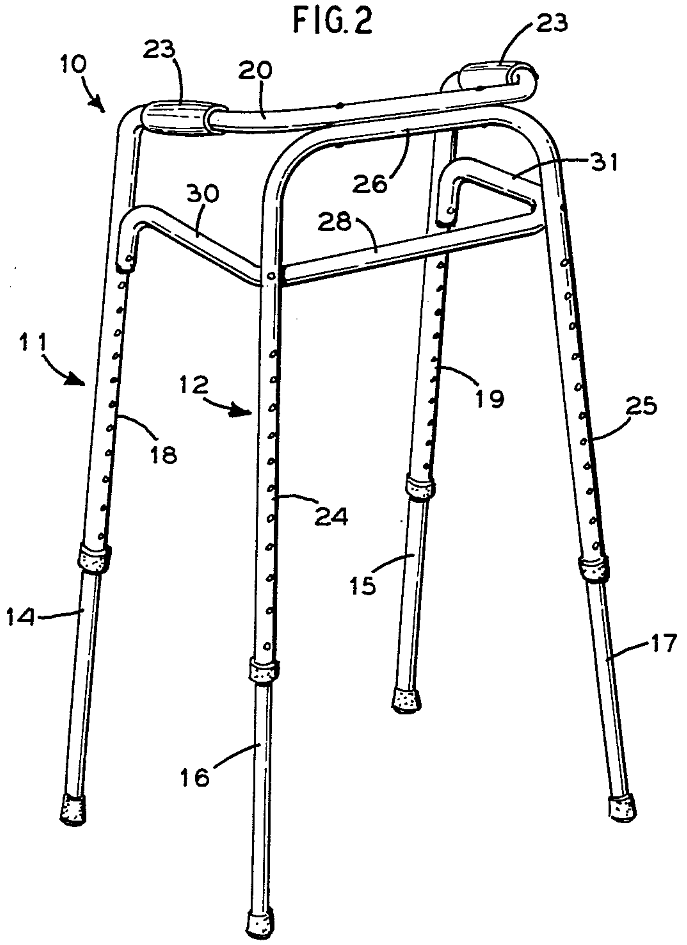
FIG. 2 is a perspective view similar to that of FIG. 1, where the leg members thereof are fully extended relative to the leg receiving portions to thereby permit the use of the walker by adults.

The walker of the instant invention is suitably fashioned from metal tubing bent to desired shapes. Thus, the walker comprises a plurality of U shaped members associated with each other to provide a rigid, stable base from which depend leg receiving portions. Leg members are provided which are slidably mounted on the leg receiving portions with provisions for locking the leg members relative to the leg receiving portions in linear adjusted positions to suit the height of the user.

Further the linear dimensions of the leg receiving portions and the associated leg members are correlated to provide several advantages including: an effective height for the walker which enables transportation of the same at reasonable rates; a single walker which may be used by individuals over a large range of heights including children at a height of 4′ 4″ to an adult with a height of 6′ 4″; and adapted for use with a toilet bowl to provide a guard and support means for the user.

Thus, as shown in the drawing, 10 designates a walker embodying the invention. The walker 10 comprises U shaped members generally indicated at 11; 12; and 13, together with leg members 14, 15, 16 and 17.

The U shaped member 11 comprises a pair of laterally spaced, substantially vertical leg receiving portions 18, 19; a pair of horizontal side arm portions 20, 21 extending forwardly from the upper ends of leg receiving portions 18, 19 and a forwardly disposed, horizontal elongated portion 22 interconnecting the forward ends of side arm portions 20, 21. Hand grips 23 are mounted on side arm portions 20, 21.

The U shaped member 12 comprises a pair of laterally related, substantially vertical leg receiving portions 24, 25 which are interconnected at their upper ends by a horizontal portion 26. The U shaped members 11, 12 are arranged so that horizontal portions 22, 26 are in abutting relation and suitably secured together as by rivets 27.

The U shaped member 13 which interconnects and braces U shaped members 11, 12; comprises a horizontal, elongated portion 28 located just below abutting portions 22, 26 and is secured to leg receiving portions 24, 25, as by rivets 29. Member 13 further includes side portions 30, 31 which extend rearwardly to leg receiving portions 18, 19, terminating in short depending portions 32, 33 which abut leg receiving portions 18, 19 and are secured thereto, as by rivets 34.

The leg members 14–17 are slidably and removably mounted on leg receiving portions 18, 19; 24, 25 telescopically for adjusting the effective height of walker 10 and to thereby suit the same to individuals of varying height.

Means is provided for releasably locking each of leg members 14–17 to associated leg receiving portions 18, 19; 24, 25 in linear adjusted positions relative thereto. To this end, leg receiving portions 18, 19; 24, 25 are formed with linearly spaced apertures 35 while leg members 14–17 are provided with spring pressed pins 36 which snap into selected apertures 35 as leg members 14–17 are manually manipulated to dispose the same in selected positions relative to leg receiving portions 18, 19; 24, 25.

It has been found that the linear dimensions of leg receiving portions 18, 19; 24, 25 may be correlated to the linear dimensions of leg members 14–17 so as to gain a number of advantages as indicated above. Thus, when leg members 14–17 have an effective length of the order of 17" to 18"; and leg receiving portions 18, 19; 24, 25 have a similar linear dimension; the single walker can be used effectively by a child or person of a height of as little as 4' 4" and an adult having a height of as much as 6' 4", as well as by individuals having heights intermediate 4' 4" and 6' 4".

Thus, for a child, the leg members 14–17 are fully retracted or retracted to positions adjacent the fully retracted position; whereas for an adult, the leg members 14–17 are either fully extended or extended to other positions less than the fully extended position.

Figure 3:
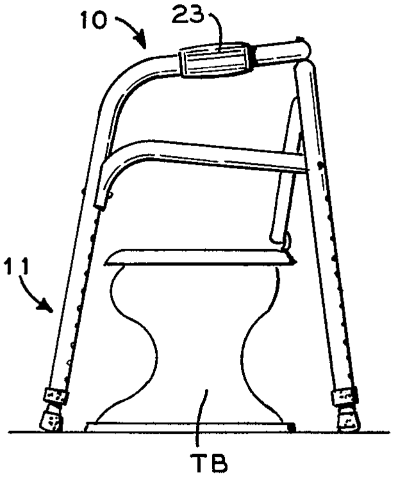
FIG. 3 is a side elevational view showing the walker in the form indicated in FIG. 1; wherein the same is used as a guard for a toilet bowl.

Further, with the leg members 14–17 in fully retracted position, the walker 10 may be positioned relative to a toilet bowl TB, FIG. 3, to provide guard or support means for the user thereof.

Also, with the leg members 14–17 in fully retracted position, the net linear height dimension is such that the walker 10 may be packaged in a suitable carton having dimensions qualifying for standardized, minimal transport charges; thus materially reducing the costs of the walker 10 including transport charges.

The lower ends of leg receiving portions 18, 19, 24, 25 are provided with tubular bumper members 38, while the lower ends of leg members 14–17 are provided with floor engaging tips 39.

I claim:

1. A walker comprising a substantially rigid, stable frame, said frame comprising:

a first U shaped member, said U shaped member comprising a pair of laterally spaced, rearwardly disposed, substantially vertical leg receiving portions, substantially horizontal side arm portions extending forwardly from the upper ends of said vertical leg receiving portions, and a forwardly disposed, horizontal elongated portion connecting the forward ends of said side arm portions;

a second U shaped member, said second U shaped member comprising a pair of laterally spaced, forwardly disposed, substantially vertical leg receiving portions, and a substantially horizontal elongated portion connecting the upper ends of said last mentioned leg receiving portions, the elongated horizontal portions of said first and second U shaped members being in abutting relation to each other and means interconnecting said abutting elongated horizontal portions;

a third U shaped member, said third U shaped member comprising a forwardly and horizontally disposed elongated portion located substantially closer to the abutted horizontal portions of said first and second U shaped members than the lower ends of the vertical leg receiving portions of the second U shaped member with the space between the vertical leg receiving portions of the second U shaped member being unobstructed below the horizontally disposed elongated portion of the third U shaped member, a pair of horizontal side portions respectively extending rearwardly from the opposite ends of said last mentioned elongated portion, and vertical portions of limited length depending from the rear ends of said last mentioned horizontal side portions;

means connecting the depending vertical portions of said third U shaped member to the leg receiving portions of said first U shaped member at points located substantially closer to the side arm portions of the first U shaped member than the lower ends of the vertical leg receiving portions of said first U shaped member;

means connecting the elongated portion of said third U shaped member to the leg receiving portions of said second U shaped member at points substantially closer to the abutted horizontal portions of said first and second U shaped member than the lower ends of the vertical leg receiving portions of the second U shaped member;

a set of leg members being received within the leg receiving portions of said first and second U shaped members in relative slidable relation to each other;

and coacting means on said leg receiving portions and said leg members for locking said leg members in adjusted positions relative to said leg receiving portions between the fully extended and the fully retracted positions of said leg members relative to said leg receiving portions; said coacting means extending between the lower ends of said leg receiving portions and the respective means for connecting said third U shaped member;

said leg members and leg receiving portions having correlated linear dimensions which provide (1) use of the walker by an individual having a height as little as 4'4" when said leg members are fully retracted; and (2) use of the walker by an individual having a height of as much as 6'4" when said leg members are fully extended.

2. A walker as in claim 1 wherein said leg receiving portions are tubular and said leg members are tubular, said leg members being telescopically related to said leg receiving portions.

3. A walker as in claim 2 wherein said leg receiving portions and said leg members are of substantially equal length.

4. A walker as in claim 3 wherein said leg receiving portions have a length of about 18".

* * * * *